B. T. STEINER & H. B. WHITE.
STEERING DEVICE FOR MOTOR VEHICLES.
APPLICATION FILED MAY 31, 1913.
1,114,817.
Patented Oct. 27, 1914.
2 SHEETS—SHEET 1.
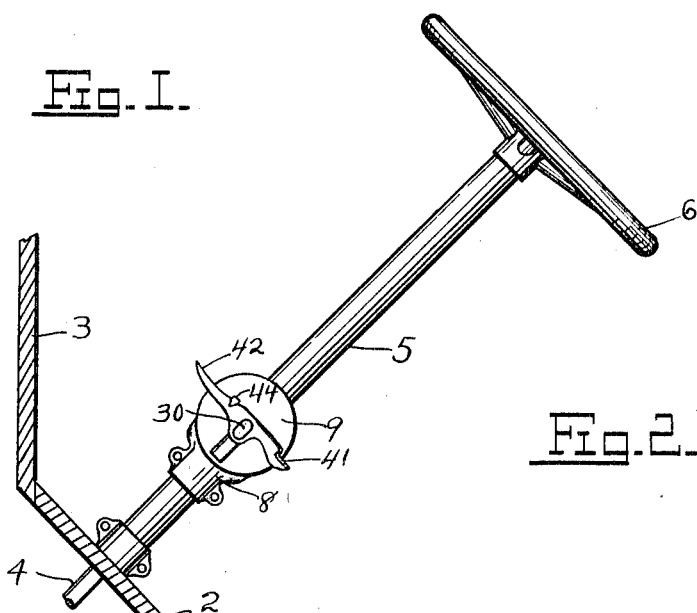
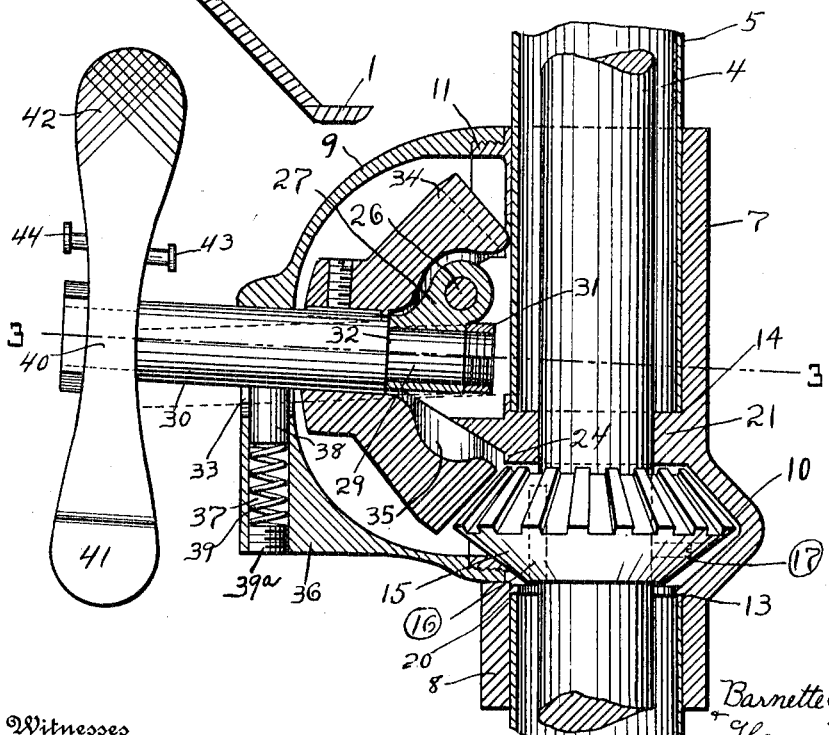
Witnesses
E. S. Hall.
Hazel Owen
Inventors
Barnette T. Steiner.
Harry B White
By Bond & Miller
Attorneys

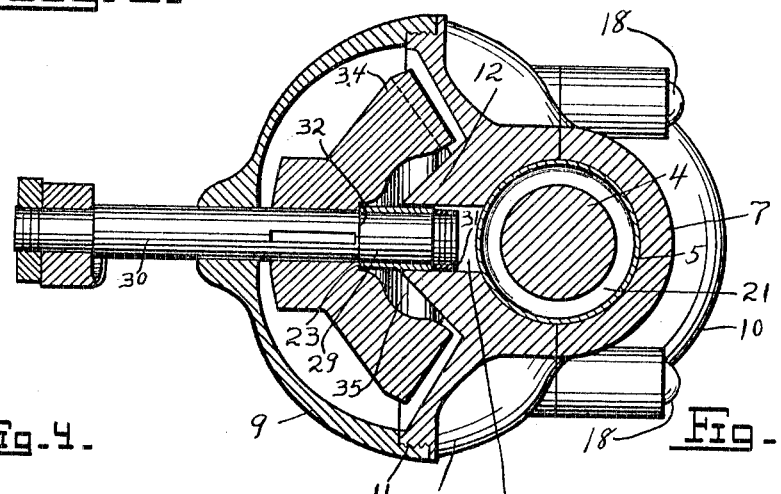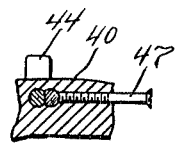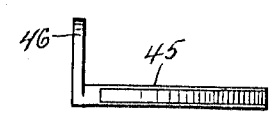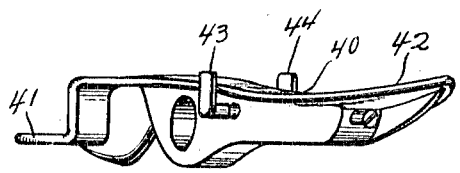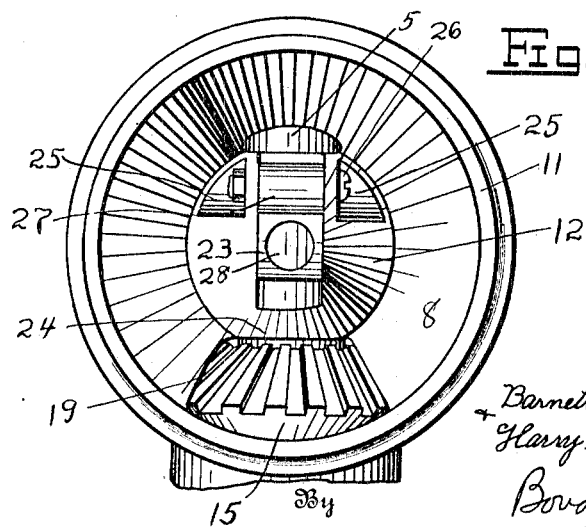

UNITED STATES PATENT OFFICE.

BARNETTE T. STEINER AND HARRY B. WHITE, OF CANTON, OHIO, ASSIGNORS TO THE GILLIAM MANUFACTURING COMPANY, OF CANTON, OHIO, A CORPORATION OF OHIO.

STEERING DEVICE FOR MOTOR-VEHICLES.

1,114,817.  Specification of Letters Patent.  Patented Oct. 27, 1914.

Application filed May 31, 1913. Serial No. 770,845.

*To all whom it may concern:*

Be it known that we, BARNETTE T. STEINER and HARRY B. WHITE, both citizens of the United States, residing at Canton, in the county of Stark and State of Ohio, have invented a new and useful Steering Device for Motor-Vehicles, of which the following is a specification.

Our invention relates to improvements in steering devices, and while the principles of the invention are capable of many useful applications, it is especially adapted for use as an auxiliary, foot-steering device applied to the manually operated steering mechanism of a motor vehicle, such as commonly in use.

The objects of the invention are, to generally improve steering devices, to provide means for pedal steering of motor vehicles and the like, to combine manual and pedal steering mechanism in such way that either may be used, or both may be used simultaneously, to provide for automatic disconnection of the pedal steering means from the manual steering means when the pedal steering means is not in use, and to provide a construction of few parts, simple and easily connected to motor vehicles and the like already in use, and which will be easily and cheaply made, strong, positive and efficient. These objects, together with other objects, which will be readily apparent to those skilled in the art, may be attained by the construction illustrated in the accompanying drawings, although our invention may be embodied in other forms, the construction illustrated being chosen by way of example.

In the drawings Figure 1 is a side elevation of a steering post and wheel of a motor vehicle provided with a steering device embodying our invention. Fig. 2 is a longitudinal sectional view through the steering post and steering device. Fig. 3 is a cross sectional view on the line 3—3 of Fig. 2. Fig. 4 is a fragmentary, sectional view through a portion of the foot lever, illustrating the method of clamping the foot retainers. Fig. 5 is a perspective view of the foot lever. Fig. 6 is a side elevation of one of the foot retainers. Fig. 7 is a side elevation of the device showing the cap member, together with the foot lever, foot lever shaft and its connected gear removed, the oscillating bearing block, however, remaining in position.

Throughout the several views similar reference numerals indicate similar parts.

More specifically describing the construction disclosed in said drawings, the numeral 1 indicates the horizontal portion and the numeral 2 the inclined portion of the floor of a motor vehicle.

The numeral 3 indicates the dash.

The numeral 4 indicates the steering shaft, the numeral 5 the steering shaft casing and the numeral 6 the steering wheel.

In the form of the invention illustrated in the drawing the casing 5 is cut away so as to give access to the shaft 4 and the steering device proper is connected to said casing and shaft, as will hereinafter more fully appear.

Referring now to the steering device proper, the frame or housing therefor is composed of a back member 7, a front member 8, and a cap member 9.

The back member 7 is, interiorly, of substantially semi-cylindrical shape, with an outwardly extending, interiorly recessed portion 10 intermediate its ends. The front member 8 is, interiorly, of a shape to complement the back member 7 so as to form an interiorly cylindrical portion provided with an annular recess, and said front member 8 is also provided with a laterally extending, annular, externally screw threaded flange 11 and an integral bearing supporting portion 12 arranged concentrically with reference to said flange. The cap member 9 is, preferably, of a general hollow-hemispherical shape and provided with internal screw threads to coact with the screw threads of the flange 11 to connect the cap member 9 to the front member 8.

The casing 5 is cut at the points 13 and 14 and the intermediate portion of said casing removed. A beveled gear 15 is then fixedly connected to the shaft 4, as by means of the key 16 and set screw 17. The back member 7 and front member 8 are then clamped together, as by means of bolts 18, so as to tightly grip the casing 5 between said members, the internally recessed portion 10 of the back member, and a lateral gear opening 19 of the front member 8 freely accommodating the gear 15. The members 7 and 8 are provided with an internal annular rib 20 which rests upon the cut end of the casing 5 at the point 13, and also with an annular bearing and rib 21 upon which rests the cut end of the casing 5, at 14, and which extends into and forms a bearing for the shaft 4 above the gear 15. An inspection of Fig. 7 in connection with Fig. 2 will clearly illustrate how the gear 15 projects laterally through the opening 19 in the front member 8, and the bearing supporting portion 12, formed as an integral portion of the member 8, projects laterally immediately above the opening 19.

The portion 12 is provided with a median, broad, grooved opening 22 having parallel side walls 23 and extending laterally entirely through the portion 12 from the upper edge thereof, downwardly almost to the opening 19, a small bridging portion 24 being preferably left for strengthening purposes. The external walls of the portion 12 are preferably of conical shape and recesses 25 in said walls provide for the insertion of a bearing hanging bolt 26 which extends across the groove 22 at its upper portion and pivotally supports the oscillating bearing block 27.

The bearing block 27 is provided with the bearing-aperture 28 in which is journaled the inner reduced end 29 of the foot lever shaft 30. Said reduced end 28 extends inwardly beyond the block 27 and is provided at its extreme end with a fixedly connected collar 31 which, together with the shoulder 32 on the shaft 30 maintains said shaft in proper position within the block 27 at all times. The shaft 30 extends outwardly through a vertically elongated aperture 33 in the cap member 9. Fixedly connected to the shaft 30 within the member 9 and on the outer side of the block 27 is the beveled gear 34, which is recessed on its inner side at 35 in such way as to extend over the block 27 toward the gear 15.

The cap member 9 is provided, below the aperture 33, with a coil spring housing portion 36 in which a spring barrel 37 is arranged in line with the longer axis of the aperture 33. Said barrel 37 opens through the bottom of the portion 36 and also opens into the aperture 33 and a shaft bearing pin 38, slidably arranged within the barrel 37 is constantly urged upwardly by a coil spring 39 within the barrel 37, a plug 39ª being arranged in the lower end of the barrel 37 to support said spring. The effect of the spring 39 is to normally raise the shaft 30 to the upper limit of the aperture 33, rocking the block 27 upon its supporting bolt 26, and lifting the gear 34 out of mesh with the gear 15.

At the outer end of the shaft 30 is fixedly mounted the foot lever 40, said shaft being connected to said lever intermediate the ends thereof. Said lever is preferably of such shape as to conform to the sole of the shoe of the operator, a recessed heel receiving portion 41 being arranged at the rear end of said lever and the forward end of said lever at 42 being preferably roughened so as to frictionally hold the sole of the shoe at the forward portion of the foot.

The foot lever 40 normally stands in inclined position, somewhat as shown in Fig. 1, so as to be in convenient position to receive the foot of the operator and for the purpose of assisting in holding the foot in place upon said lever the foot retainers 43 and 44 are provided. Each of said retainers comprises a stem portion 45 and an integral, upwardly extending sole engaging lug 46. The stem portion 45 is flattened on one side, and two transversely extending apertures are drilled through the body of the lever 40 in such close relation as to laterally open into each other. The stems 45 of the foot retainers are then arranged in the two apertures so drilled, their flat sides slidably engaging each other, as clearly illustrated in Fig. 4. A set screw 47 is then arranged in the body of the lever 40 so as to engage the stem portion 45 of one of the retainers to clamp said retainers into fixed adjustment. Said retainers should be so adjusted with relation to the shoe of the operator that the lugs 46 will engage the edge of the sole where it broadens out laterally at the forward portion of the instep. It will be readily apparent that the construction described will permit the operator to readily and quickly place his foot in position upon the foot lever or remove the same therefrom and that upon placing his foot upon the lever the lugs 46 will so engage the sole of his shoe as to prevent his foot from slipping from the lever by reason of vibration and the like.

Attention has been called to the fact that the spring 39 normally maintains the shaft 30 in a raised position so as to disengage the gears 15 and 34. As soon, however, as the operator places his foot upon the lever 40, the weight of his foot overcomes the said spring, thus moving the outer end of the shaft 30 down to the position illustrated in dotted lines in Fig. 2, and bringing the gear 34 into mesh with the gear 15. It will be apparent that when the said gears have been brought into mesh the operator may steer the vehicle by a rocking or oscillation of the foot lever 40, requiring but slight effort.

It will be readily apparent to those skilled in the art that should it be desired, the device may be made for operation by both feet, one on each side of the steering post, such change being perfectly obvious, requiring mere duplication of parts.

The advantages of the device, especially when used as an auxiliary steering device upon the steering post of a motor vehicle of usual construction, will also be apparent.

Experienced motor vehicle drivers are well aware of the tiresome strain upon the arms incident to constant manual manipulation of the steering wheel on long trips, said strain being increased by the constant jarring and vibration of said wheel.

While the steering mechanism herein described may be employed for all purposes without the use of the steering wheel, yet in cases where it is employed only as auxiliary, the driver may occasionally relieve the strain upon his arms by steering for a period with his foot. Again, in adjusting the hat or gloves or attending to the arrangement of side curtains, robes, or any of the mechanism of the car while driving, or even while lighting a cigar it will be found exceedingly convenient to have an auxiliary device which will be absolutely dependable and safe and by which the car may be steered without the use of the hands, thus safely obviating the necessity of making many stops, with the consequent loss of time and the attendant annoyance of gear shifting and the like in starting. Many other advantages will be readily apparent.

While the construction hereinbefore described discloses the principle of the invention and the best mode in which we have contemplated applying such principle it will be understood that many changes may be made in the device, as experience suggests or circumstances may require, without departing from the spirit of the invention, within the scope of the appended claims.

We claim:—

1. For a motor vehicle, in combination with the steering post thereof, including a steering shaft and casing, pedally operable, steering shaft actuating means connected to said casing and adapted to move into operative connection with said shaft when the foot of the operator is on said means and to automatically move out of such connection when the foot of the operator is removed therefrom.

2. For a motor vehicle, in combination with the steering post thereof, including a steering shaft and casing, a steering wheel mounted upon the upper end of said shaft, and pedally operable, steering shaft actuating means connected to said casing intermediate the ends thereof and adapted to move into operative connection with said shaft when the foot of the operator is on said means and to automatically move said means out of such connection when the foot of the operator is removed therefrom.

3. For a motor vehicle, in combination with the steering shaft thereof, a foot lever adjustably connected to said shaft and adapted to be moved downwardly into operative connection with said shaft and upwardly, out of operative connection with said shaft, and automatic means for raising said lever to its upper position, said automatic means being adapted to be overcome by the weight of the foot of the operator to permit said foot lever to move to its lower position when the foot of the operator is placed thereon.

4. For a motor vehicle, in combination with the steering post thereof, comprising a steering shaft and casing therefor, a foot lever shaft having its inner end pivotally connected to said casing, a first gear fixedly mounted upon said steering shaft, a second gear fixedly mounted upon said foot lever shaft and movable into and out of mesh with said first gear as said foot lever shaft is pivotally moved and a foot lever fixedly connected to said foot lever shaft.

5. For a motor vehicle, in combination with the steering post thereof, comprising a steering shaft and a casing therefor, steering-shaft-operating means connected to said casing and movable into and out of operable connection with said steering shaft and adapted to be operated by the foot of the operator.

6. For a motor vehicle, in combination with the steering shaft thereof, an auxiliary device movable into and out of operable connection with said steering shaft, foot operated means for moving said device into and out of such connection and for actuating said device when the same is in such connection.

7. For a motor vehicle, in combination with the steering shaft thereof, a rotatable auxiliary shaft extending laterally from said steering shaft and operatively connected thereto and means mounted upon said auxiliary shaft and adapted to receive the foot of the operator and to be actuated thereby.

8. For a motor vehicle, in combination with the steering post thereof, comprising a steering shaft and casing therefor, an auxiliary steering device comprising a first gear fixedly mounted upon said steering shaft, a housing connected to said casing and inclosing said first gear, a second gear within said housing and meshing with said first gear and means extending outwardly from said casing, operatively connected to said second gear, and adapted to be actuated by the foot of the operator.

9. For a motor vehicle, in combination with the steering post thereof, comprising a steering shaft and a casing therefor, an auxiliary steering device comprising a housing connected to said casing, a foot lever shaft connected to said housing, extending outwardly therefrom, and provided at its outer end with a foot lever, and means arranged within said housing and constituting operative connection between said foot lever and said steering shaft.

10. For a motor vehicle, in combination with the steering post thereof, comprising a steering shaft and casing therefor, a steering device comprising a housing formed of front and back members clamped to said casing and a cap member connected to the front member, a foot lever shaft connected to said front member and cap member, means operatively connecting said foot lever shaft and steering shaft, and a foot lever connected to said foot lever shaft and adapted to actuate the same.

11. For a motor vehicle, in combination with the steering post thereof, including a steering shaft and casing, a steering device comprising a housing connected to said casing, a first gear fixedly connected to said steering shaft, a foot lever shaft pivotally connected to said housing at its inner end and having its outer end movable in the longitudinal plane of said steering shaft, a second gear mounted on said foot lever shaft and movable, with said foot lever shaft downwardly into and upwardly out of mesh with said first gear, means for limiting the pivotal movement of said foot lever shaft, spring means for normally maintaining said foot lever shaft in its most upward position, a foot lever fixedly connected to said foot lever shaft and said spring means adapted to be overcome by the weight of the foot of the operator when placed upon said foot lever.

In testimony that we claim the above, we have hereunto subscribed our names in the presence of two witnesses.

BARNETTE T. STEINER.
HARRY B. WHITE.

Witnesses:
WILLIAM H. MILLER,
J. W. CRAINE.

---

Copies of this patent may be obtained for five cents each, by addressing the "Commissioner of Patents, Washington, D. C."